US012717970B2

(12) United States Patent
Thevenon et al.

(10) Patent No.: US 12,717,970 B2
(45) Date of Patent: Aug. 25, 2026

(54) PROCESS AND CIRCUIT FOR VERIFYING THE INTEGRITY OF A SOFTWARE APPLICATION

(71) Applicant: Commissariat à l'Energie Atomique et aux Energies Alternatives, Paris (FR)

(72) Inventors: Pierre-Henri Thevenon, Grenoble (FR); David Hely, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 334 days.

(21) Appl. No.: 18/349,156

(22) Filed: Jul. 9, 2023

(65) Prior Publication Data

US 2024/0020422 A1 Jan. 18, 2024

(30) Foreign Application Priority Data

Jul. 12, 2022 (FR) ........................................ 2207125

(51) Int. Cl.
*G06F 21/64* (2013.01)
*H04L 9/32* (2006.01)

(52) U.S. Cl.
CPC ............ *G06F 21/64* (2013.01); *H04L 9/3278* (2013.01); *G06F 2221/033* (2013.01)

(58) Field of Classification Search
CPC ......... G06F 21/64; H04L 9/32; H04L 9/3278; H04L 9/0861
See application file for complete search history.

(56) References Cited

U.S. PATENT DOCUMENTS

2003/0126424 A1* 7/2003 Horanzy ............... G06F 9/4405 713/2
2006/0200672 A1* 9/2006 Calhoon ................. G06F 21/16 713/176
2007/0220500 A1* 9/2007 Saunier ................. G06F 21/575 717/162
2014/0258736 A1* 9/2014 Merchan ............... H04L 9/0866 713/193

(Continued)

FOREIGN PATENT DOCUMENTS

EP 3373178 A1 9/2018

OTHER PUBLICATIONS

Geert-Jan Schrijen et al., Comparative analysis of SRAM memories used as PUF primitives, IEEE Xplore (Year: 2012).*

(Continued)

*Primary Examiner* — Shanto Abedin
(74) *Attorney, Agent, or Firm* — Jordan IP Law, LLC

(57) ABSTRACT

The present disclosure relates to a process for verifying the integrity of software by a verification circuit, the process comprising: loading (401) the software into a first volatile memory; computing (402) a first verification value by the verification circuit; computing (403) a second verification value by applying a physically unclonable function to the first verification value; comparing (404), by the verification circuit, the second verification value with a reference value; and if it is found that the second verification value differs from the reference value, generating a warning signal (405) at the output of the verification circuit.

15 Claims, 7 Drawing Sheets

(56) References Cited

U.S. PATENT DOCUMENTS

| | | | | |
|---|---|---|---|---|
| 2015/0207624 | A1* | 7/2015 | Laver | H04L 9/0894 713/189 |
| 2015/0347216 | A1* | 12/2015 | Kim | G06F 11/0751 714/824 |
| 2016/0306976 | A1* | 10/2016 | Gantman | G06F 21/44 |
| 2016/0359636 | A1* | 12/2016 | Kreft | H04L 63/0428 |
| 2021/0081569 | A1* | 3/2021 | Hely | G06F 21/79 |
| 2023/0091028 | A1* | 3/2023 | Norrod | H04L 9/3263 713/189 |
| 2025/0219826 | A1* | 7/2025 | Liu | H04L 9/088 |

OTHER PUBLICATIONS

Preliminary Search Report for French Application No. 2207125 dated Feb. 16, 2023, 2 pages.

Hamadeh, Hala, and Akhilesh Tyagi. "Physical unclonable functions (pufs) entangled trusted computing base." In 2019 IEEE International Symposium on Smart Electronic Systems (iSES)(Formerly iNiS), pp. 177-180. IEEE, 2019.

Hamadeh, Hala, Abdallah Almomani, and Akhilesh Tyagi. "Probabilistic verification of outsourced computation based on novel reversible PUFs." In Service-Oriented and Cloud Computing: 8th IFIP WG 2.14 European Conference, ESOCC 2020, Heraklion, Crete, Greece, Sep. 28-30, 2020, Proceedings 8, pp. 30-37. Springer International Publishing, 2020.

Marconot, Johan, David Hely, and Florian Pebay-Peyroula. "SPN-DPUF: substitution-permutation network based secure circuit for digital PUF." In 2019 IEEE Computer Society Annual Symposium on VLSI (ISVLSI), pp. 49-54. IEEE, 2019.

Gassend, Blaise. "Physical random functions," M.S. diss., (Massachusetts Institute of Technology, 2003).

Lim, Daihyun, Jae W. Lee, Blaise Gassend, G. Edward Suh, Marten Van Dijk, and Srinivas Devadas. "Extracting secret keys from integrated circuits." IEEE Transactions on Very Large Scale Integration (VLSI) Systems 13, No. 10 (2005): 1200-1205.

Kanuparthi, Arun K., Ramesh Karri, Gaston Ormazabal, and Sateesh K. Addepalli. "A high-performance, low-overhead microarchitecture for secure program execution." In 2012 IEEE 30th International Conference on Computer Design (ICCD), pp. 102-107. IEEE, 2012.

* cited by examiner

PROCESS AND CIRCUIT FOR VERIFYING THE INTEGRITY OF A SOFTWARE APPLICATION

FIELD

The present disclosure relates to the field of processes and circuits for the security of electronic circuits, and in particular a circuit and a process for verifying the integrity of a software application in the circuit.

BACKGROUND

Electronic devices comprising an embedded IoT (Internet of Things) system are prone to attacks. For example, the attacker can perturb the system by using fault injection techniques to modify the execution flow of a code, or exploit software vulnerability to modify the code, misappropriate it or inject malicious codes. Injected malicious code modifies for example the operating software of the device such as application codes which may compromise the operation, security and confidentiality of sensitive data of the device.

Various techniques have been developed to verify that a given software application is properly executed. These techniques are for example implemented statically, before the software is executed, or dynamically, directly during execution of the software.

These techniques are based on a comparison between reference values and values calculated on the basis of codes and/or executed software. For more security, one or more cryptographic keys can be used to encrypt the reference values. If an attack reveals these cryptographic keys, the security of the entire device is compromised. Moreover, the use of encryption entails an increase in energy consumption and calculation time.

SUMMARY

There is a need to improve the methods of verifying the integrity of software executed by an electronic device.

One embodiment addresses some or all of the drawbacks of known verification methods.

One embodiment provides a process for verifying, by a verification circuit, the integrity of a software application, the process comprising:

- loading the software into a first volatile memory;
- computing a first verification value by the verification circuit;
- computing a second verification value by applying a physically unclonable function to the first verification value;
- comparing the second verification value, by the verification circuit, with a reference value; and
- if it is found that the second verification value differs from the reference value, outputting, by the verification circuit, a warning signal.

According to one embodiment, the above process further comprises, before the verification of the integrity of the software, obtaining a reference value by applying the physically unclonable function to a value generated based on the software.

According to one embodiment, obtaining a reference value by applying the physically unclonable function comprises storing an image of a physically unclonable function in a memory of a device external to the verification circuit, and generating the reference value based on the software and the image, the process further comprising the storage of the reference value in a second non-volatile memory.

According to one embodiment, obtaining the reference value is performed upon loading the software into the first memory and the reference value is stored in the first memory.

According to one embodiment, obtaining the reference value is performed by applying the unclonable physical function to an input value based on the value generated from the software and on a random value.

According to one embodiment, the random value is equal to a first value for a first booting of the verification circuit and equal to a second value, different from the first value, for a second booting of the verification circuit.

According to one embodiment, the above process further comprises, before loading the software into the first memory, adding a verification instruction to the software triggering the computation of the first verification value.

According to one embodiment, the verification circuit implements a counter configured to indicate that a time after loading the software in the first memory is reached, the verification circuit being configured to verify that the verification instruction has been executed once the time has been reached.

According to one embodiment, the physically unclonable function is a strong physically unclonable function, specific to the verification circuit.

One embodiment provides a circuit comprising:

- a first volatile memory in which the software is loaded;
- a processor configured to calculate a first verification value;
- a physically unclonable function circuit configured to generate a second verification value based on the first verification value; and
- a verification circuit configured to verify the integrity of a software application by comparing the second verification value with a reference value and generating at its output a warning signal if the second verification value differs from the reference value.

According to one embodiment, the physically unclonable function circuit is further configured, before verifying the integrity of the software, to generate the reference value based on a value generated by the processor and from the software.

According to one embodiment, the generation of the reference value by the physically unclonable function circuit comprises the storage of an image of the physically unclonable function circuit in the memory of a device external to the verification circuit, the physically unclonable function circuit being further configured to generate the reference value from the software and from the image, the verification circuit being further configured to store the reference value in a second non-volatile memory.

According to one embodiment, the physically unclonable function circuit is configured to generate the reference value upon loading the software in the first memory, the verification circuit being further configured to store the reference value in the first memory.

According to one embodiment, the physically unclonable function circuit is configured to implement a strong physically unclonable function.

One embodiment provides a system for initializing a device, the system comprising:

- the above circuit;
- a device external to the circuit; and
- a memory of an external device configured to store an image of the function produced by the physically unclonable function circuit, the external device being configured to generate the reference value based on the image of the function produced by the physically unclonable function circuit.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the electronic design of devices is within the capabilities of those skilled in the art and certain elements have not been detailed in the description that follows.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless specified otherwise, when reference is made to absolute positional qualifiers, such as the terms “front”, “back”, “top”, “bottom”, “left”, “right”, etc., or to relative positional qualifiers, such as the terms “above”, “below”, “higher”, “lower”, etc., or to qualifiers of orientation, such as “horizontal”, “vertical”, etc., reference is made to the orientation shown in the figures.

Unless specified otherwise, the expressions “around”, “approximately”, “substantially” and “in the order of” signify within 10%, and preferably within 5%.

A physically unclonable function (PUF) is the expression of a specific characteristic of a physical object such as an integrated circuit. This characteristic is based on random physical features introduced during manufacture of the circuit and remaining unchangeable during the life of the circuit. These features produce variations distinct from one circuit to another. The expression of a PUF depends on the unique character of the physical microstructure of the associated circuit. This microstructure depends on random physical features introduced during manufacture of the circuit. These features are unpredictable and uncontrollable, making it practically impossible to duplicate or clone the structure.

The term “function” is used because a characteristic is exploited by evaluating the response of an instance of an object to a given input, called “challenge”. The PUF can then be characterized from a set of challenge-response pairs. The response of a PUF is unique and unpredictable.

Two types of PUF are distinguished: a weak PUF and a strong PUF. A weak PUF is a PUF which contains a small number of challenge-response pairs (or even a single pair) while a strong PUF has a very high number of challenge-response pairs, for example at least $2^{32}$ challenge-response pairs.

Figure 1:
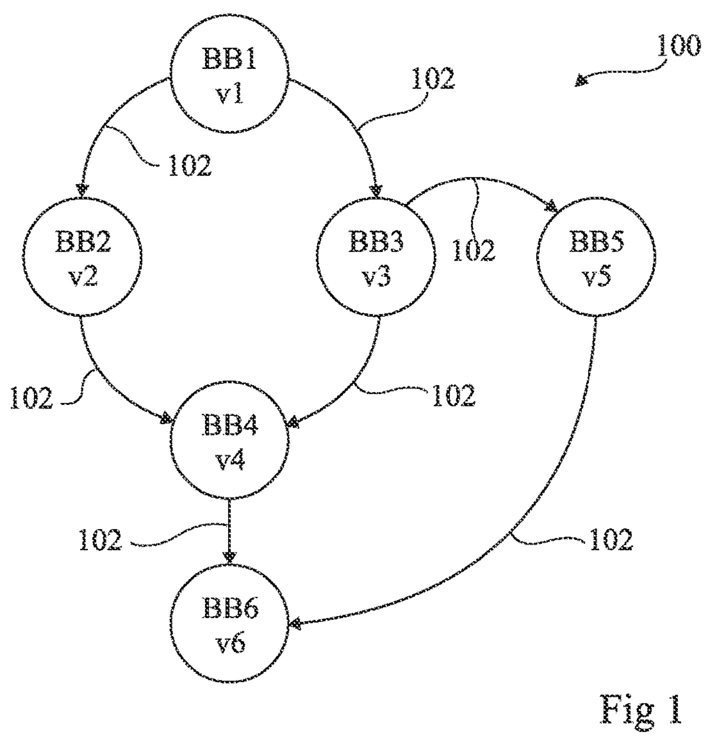
FIG. 1 is a graph illustrating an example of a control flow of a succession of sets of instructions from a software application.

FIG. 1 is a graph illustrating an example of a control flow 100 of a succession of sets of instructions from a software application.

As an example, a software application, shown by the graph 100, is divided into six basic blocks BBi, i being an integer between 1 and 6. Each basic block corresponds to a peak vi of the graph 100.

Each basic block is a linear succession of consecutive instructions from the software containing no branches except at the very end. Thus, a basic block is always executed sequentially and in a unitary manner.

While a set of instructions from a basic block is being executed, no software instruction from outside this basic block can be executed.

When two basic blocks are coupled by an arrow 102, representing an edge of the graph 100, there can be a transfer of control. As an example, an edge couples a basic block BB2 to the basic block BB1. A transfer of control can then take place between the basic block BB1 to the basic block BB2.

Thus, the graph of control flow 100 illustrates the possible software execution paths.

Integrity verification techniques on the control flow verify that an executed path conforms to the corresponding flow control graph. In certain solutions, the verifications are performed according to the flow control graph in order to guarantee that each basic block of the graph is correctly executed by the processor and that each transition of a basic block to another basic block takes place along an edge of the graph.

Solutions exist to calculate the reference values used for the verification. The reference values are for example pre-calculated before the software is executed, for example while programming. Each time the software is executed, these data are recalculated for comparison with the pre-calculated reference values. If a basic block has been modified or if there has been an invalid transfer of control, the recalculated data do not match the reference values, and the device triggers for example an alarm signal.

As an example, for each basic block, a reference value is calculated on the basis of the set of instructions composing the basic block. As an example, the reference value is a signature value or a checksum.

Figure 2:
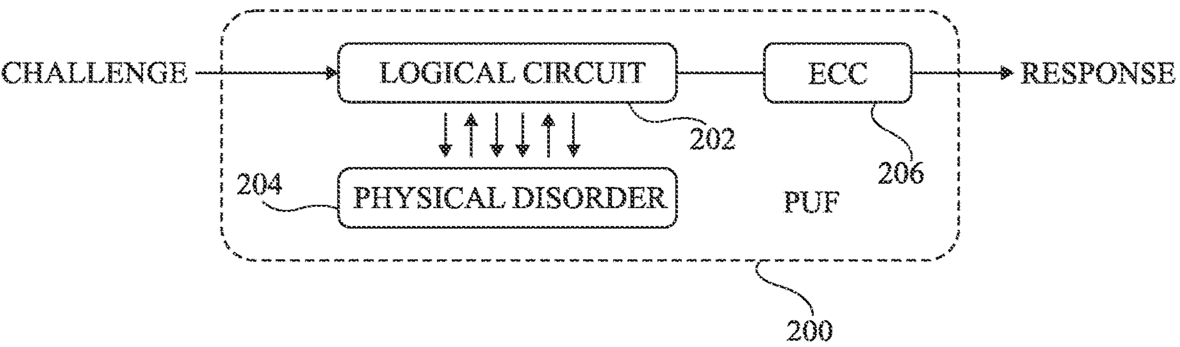
FIG. 2 is a block diagram illustrating a physically unclonable function.

FIG. 2 is a block diagram illustrating a physically unclonable function (PUF).

As an example, an integrated circuit 200 comprises a logical circuit 202 (LOGICAL CIRCUIT). The logical circuit 202 receives for example a CHALLENGE and returns a RESPONSE depending on the challenge and on one or more physical or analog parameters 204 (PHYSICAL DISORDER). The parameter(s) 204 represent at least one physical variation occurring for example during manufacture of the circuit 200. As an example, the parameter(s) 204 are related to the manufacture of a semiconductor component of the circuit 200. Thus, for the same input, the response generated will differ from one integrated circuit 200 to another. Furthermore, since the response of the PUF is based on manufacturing hazard, there is no correlation between the two outputs, resulting from two different challenges.

The physical or analog parameter(s) on which a PUF is based may be sensitive to external conditions such as for example temperature or humidity and for example the ageing of the circuit 200. In order to compensate for the influence of these conditions on the generation of the response, the logical circuit 202 supplies for example a first response to an additional circuit (ECC) 206 configured to correct the first response and supply the response. As an example, the additional circuit 206 comprises an error correction code (ECC). There also exist PUFs, for example known to persons skilled in the art as digital PUFs, which are not sensitive to these perturbations and which therefore do not require any correction.

Figure 3:
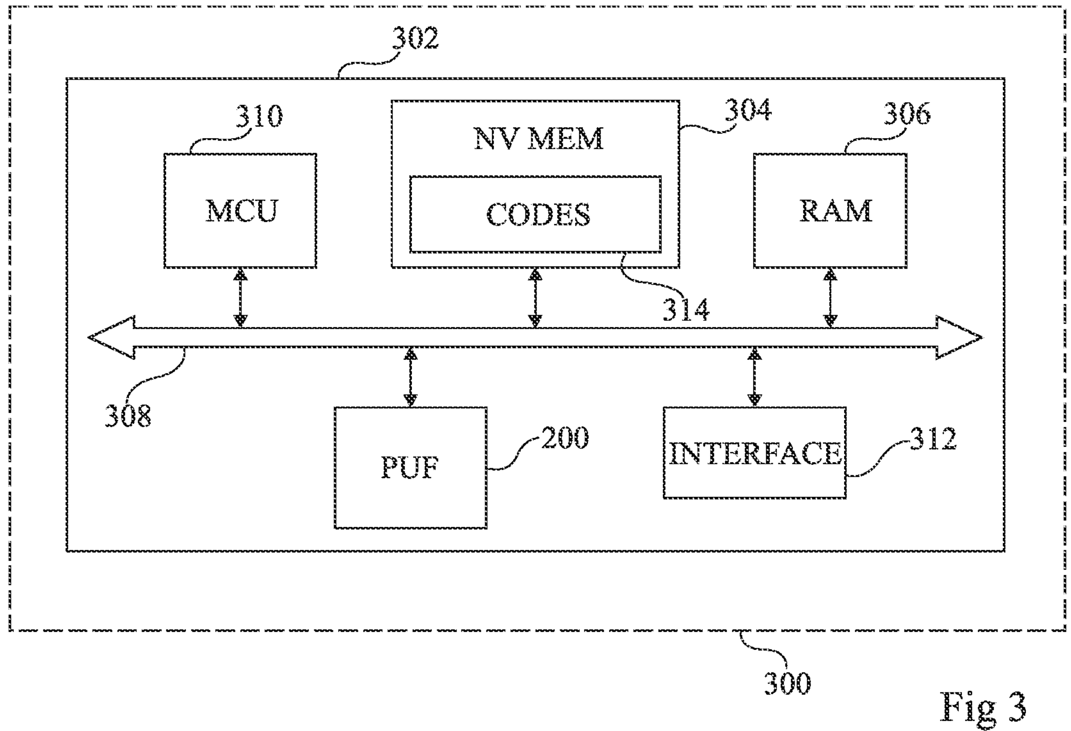
FIG. 3 shows highly schematically as a block diagram an electronic device comprising an integrated circuit according to an embodiment of the present disclosure.

FIG. 3 shows highly schematically as a block diagram an electronic device 300 comprising an integrated circuit 302 according to an embodiment of the present disclosure.

The electronic device 300 is for example an electronic board such as a microcircuit board, computer hardware, a microprocessor circuit, etc.

The integrated circuit 302 comprises for example a non-volatile memory (NV MEM), for example a flash memory and a volatile memory 306 (RAM), for example a random access memory. Memories 304 and 306 are for example coupled through a bus 308 to a processor 310 (MCU). The bus 308 comprises for example a data bus and a control bus. In another example, the bus 308 is an SPI (serial peripheral interface) or an I2C (inter-integrated circuit) bus.

The integrated circuit 302 comprises for example the circuit 200 (PUF) implementing a physically unclonable function, for example a strong physically unclonable function, coupled to the bus 308. The integrated circuit 302 further comprises for example an interface 312 (INTERFACE).

The non-volatile memory 304 comprises for example software 314 (CODES), such as for example boot codes and/or application codes for the device 300.

According to one embodiment, before execution of the software 314, for example just after installation of the software 314 in the non-volatile memory 304 or following each starting of the processor 310, software 314 reference values are calculated by the PUF 200 from values generated on the basis of the software 314. As an example, the reference values are calculated by applying the PUF 200 to the checksums of one or more operands of one or more basic blocks of the software 314. As an example, the calculated reference values are then stored in the volatile memory 306. During execution of the software 314, the verification values are calculated by applying the PUF 200 to the values generated from the software loaded into the volatile memory 306. The verification values thus obtained are compared with the previously stored reference values, for example in the volatile memory 306.

According to another embodiment, an image of the PUF 200 comprising all the challenge-response pairs of the PUF 200 is stored in a memory of an external device, such as for example a database (not illustrated) of the device 300. The image is for example stored in the memory of the external device before installation of the software 314 in the non-volatile memory 304. After installation of the software 314 in the non-volatile memory 304, the reference values are for example obtained after a request to the memory of the external device and are stored in the non-volatile memory 304. On loading the software 314 into the volatile memory 306, verification values are then calculated by applying the PUF 200 to the values generated from the software loaded into the volatile memory 306 and are compared with the reference values stored in the non-volatile memory 304.

Figure 4:
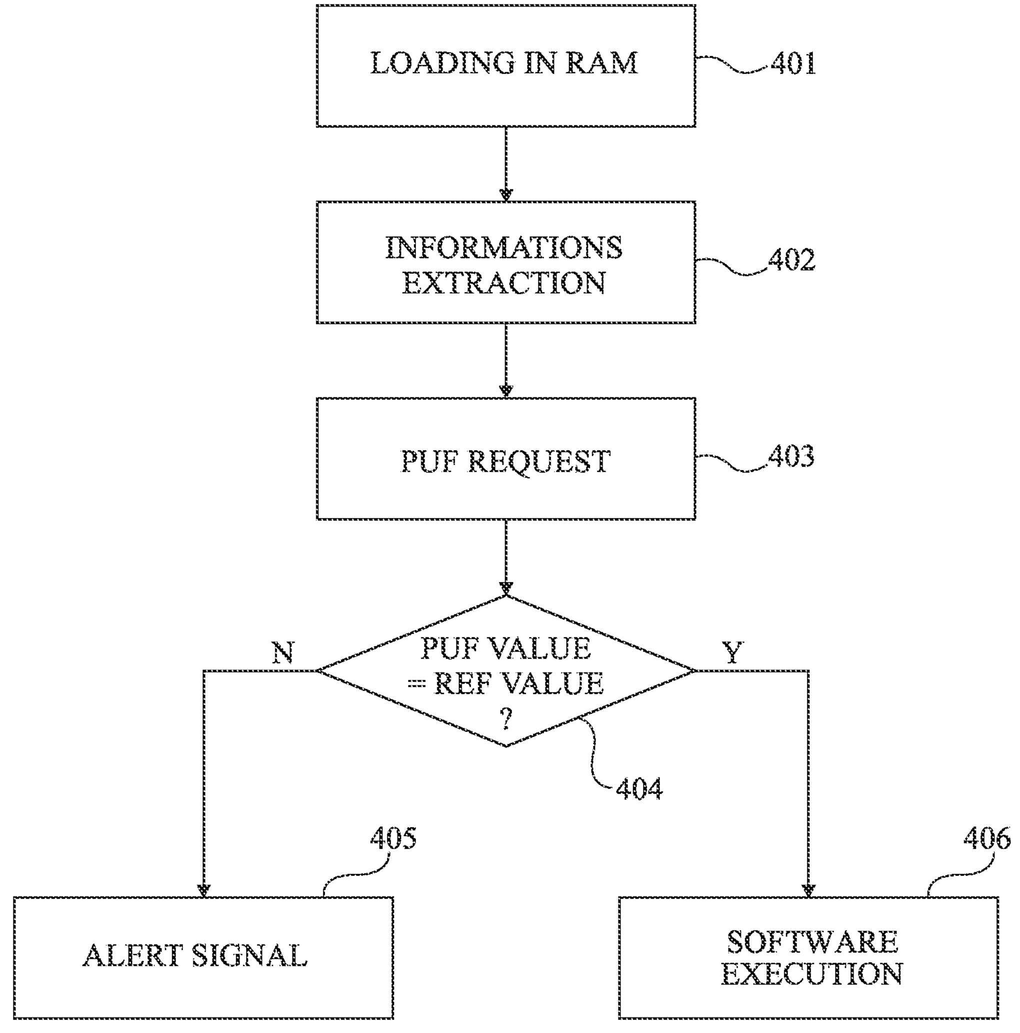
FIG. 4 is a flow chart showing the operations in a process for verifying the integrity of software according to an example of the present disclosure.

FIG. 4 is a flow chart showing the operations in a process for verifying the integrity of software according to an example of the present disclosure.

In a first step 401 (LOADING IN RAM), the software 314 is for example loaded from the non-volatile memory 304 to the volatile memory 306 to be executed. In order to verify the integrity of the software 314, a value associated with the software 314 is for example generated by the processor 310 in a step 402 (INFORMATION EXTRACTION).

As an example, the value is generated from a section of the software 314 corresponding for example to a set of instructions and/or operands of a basic block of the flow control graph describing the software 314.

As an example, the value generated corresponds to a checksum, set of instructions and/or operands of the software 314.

A verification value is then obtained in a step 403 (PUF REQUEST). The verification value is for example obtained by supplying the value generated by the processor 310 as challenge to the PUF 200.

In a step 404 (PUF VALUE=REF VALUE?), the verification value obtained in step 403 is compared, for example by the processor 310, with the reference value stored in the non-volatile memory 304 or in the volatile memory 306. As an example, an identifier is attributed to each basic block and each reference value is stored in association with the basic block identifier that it protects. During execution of step 404, the processor 110 uses for example the identifier of the part of the software concerned to find the corresponding reference value in the memory. In another example, the software is instrumented upstream to incorporate the reference values. In this example, the reference values do not need to be stored in a memory of the device 300.

In the case where, during execution of step 404, the verification value differs from the reference value (branch N), this arises from the fact that the section of the software 314 verified is not what it should be. The process continues in a step 405 (ALERT SIGNAL) in which the integrated circuit 302 generates for example an alert signal. As an example, the alert signal interrupts the execution of the software loaded into the volatile memory 306.

In the case where, during execution of step 404, it is determined that the verification value is equal to the reference value (branch Y), the process continues in step 406 (SOFTWARE EXECUTION) in which the verified section of the software 314 is executed by the processor 310.

Figure 5:
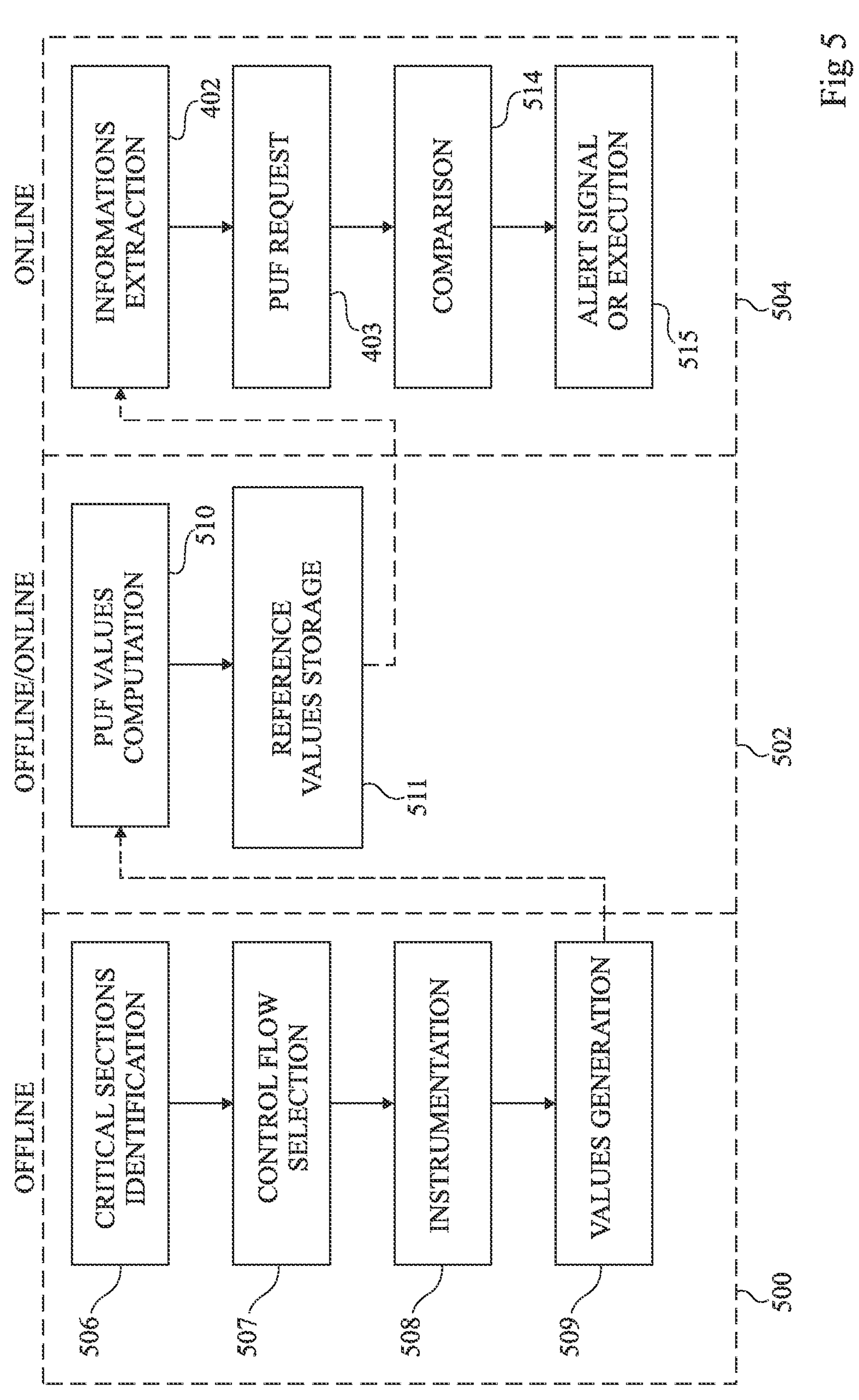
FIG. 5 is a flow chart showing the operations in a process for verifying the integrity of software according to another example of the present disclosure.

FIG. 5 is a flow chart showing the operations in a process for verifying the integrity of software according to another example of the present disclosure.

In particular, the integrity verification process illustrated in FIG. 5 comprises three phases 500 (OFFLINE), 502 (OFFLINE/ONLINE) and 504 (ONLINE).

Phase 500 is for example performed by the device 300 directly after the installation of the software 314 in the non-volatile memory 304. In other embodiments, phase 500 is performed by the device external to the device 300 comprising the memory in which an image of the PUF 200 is saved. Phase 500 comprises for example steps 506, 507, 508 and 509.

In step 506 (CRITICAL SECTIONS IDENTIFICATION), sections of the software 314 to be monitored are identified. A section corresponds for example to a set of instructions or operands forming a basic block of the software 314. As an example, the sections concerned have sensitive and/or critical contents in terms of confidentiality. In certain embodiments, all the software 314 is defined as critical, and it is then optional to perform step 506.

In step 507 (CONTROL FLOW SELECTION), a control flow of sections identified in step 506 and in agreement with the flow control graph is selected.

In step 508 (INSTRUMENTATION), the sections of the software 314 identified in step 506 are for example instrumented. In another example, all of software 314 is instrumented. The instrumentation of all the software 314, or critical sections of the software 314, consists in adding instructions for performing the verification process described in relation to FIG. 4. As an example, these instructions are added to each basic block of the software 314 or only to those sections of software identified in step 506.

In step 509 (VALUES GENERATION), values, such as for example checksums, are generated, for example, by the processor 310, for each section of the instrumented software 314. Although the example in which the values generated corresponds to the checksums of sets of instructions, other values for characterizing a set of instructions may of course be envisaged. As an example, reference values are generated after applying a hash function taking as input for example the set of instructions composing each basic block or each section of the software to protect. In other examples, the reference values are generated by applying control flow integrity (CFI) techniques familiar to those skilled in the art.

Phase 502 consists in obtaining reference values by applying the PUF 200 and storing them. Phase 502 is for example performed by the device 300. In other embodiments, phase 502 is performed by the external device. Phase 502 comprises for example steps 510 and 511.

In step 510 (PUF VALUES COMPUTATION), the values generated in step 509 are for example supplied as challenge to the PUF 200. The PUF 200 then generates one by one the corresponding reference values to the corresponding responses to the generated values supplied. Thus, for the two distinct electronic devices 300 comprising the same software 314, the values generated by the processor 310 from the same set of instructions will be the same, but the responses to the two PUFs 200 will be different.

In another example, in the case where, in step 510, the values are generated by the external device, the external device is for example configured to communicate with the memory of the external device in which an image of the PUF 200 is stored. The external device is then configured to determine the value of the response of the PUF 200 when the challenge matches the values generated.

In step 511 (REFERENCE VALUES STORAGE), the reference values are then stored in a memory in the device 300. As an example, each reference value is stored in association with an identifier of the section of software which it protects. In another example, the software is instrumented upstream to incorporate the reference values. In this example, the reference values do not need to be stored in a memory of the device 300.

According to one embodiment, the reference values are stored in the non-volatile memory 304. Phase 502 is then said to be OFFLINE. The reference values are stored in the non-volatile memory 304 when for example an image of the PUF 200 has for example been saved in a memory of the external device. The reference values then correspond to the version of the software 314 stored in the non-volatile memory.

According to one embodiment, the reference values are stored in the non-volatile memory 306. Phase 502 is then said to be ONLINE, i.e. it is performed on each loading of software 314 in the volatile memory 306, for example, each time the device 300 is started. The reference values then correspond to the version of the software 314 stored in the volatile memory 306. When phase 502 is performed online, the reference values can vary from one starting of the device 300 to another. This is for example possible by varying the sections identified during step 506 and/or by introducing other variations in the calculation of the reference values.

Phase 504 (ONLINE) is the verification of the integrity of software 314 before they it is executed. The software 314 is then in the volatile memory 306 which is for example a less secure memory than the non-volatile memory 304. Phase 504 comprises for example steps 402 and 403 together with steps 514 and 515.

Phase 504 comprises the set of steps 402 and 403 in FIG. 4 in which one or more values are generated, for example by the processor 310 and from one of the sections of the software 314 that have been instrumented instep 508. These values correspond for example to the checksum of the section of the software 314 concerned. The value of the corresponding verification is then obtained, for example by supplying the value(s) generated in step 402 as values challenge for the challenge to the PUF 200. The verification value then corresponds to the response returned by the PUF 200.

Step 514 (COMPARISON) is identical to step 404 and consists in comparing the verification value obtained in step 403 with the reference value corresponding to the section of the software 314 concerned and stored in the memory 304 or 306 during step 511.

Step 515 (ALERT SIGNAL OR EXECUTION) corresponds to step 405 or step 406 according to the result of the comparison made in step 514.

Figure 6A:
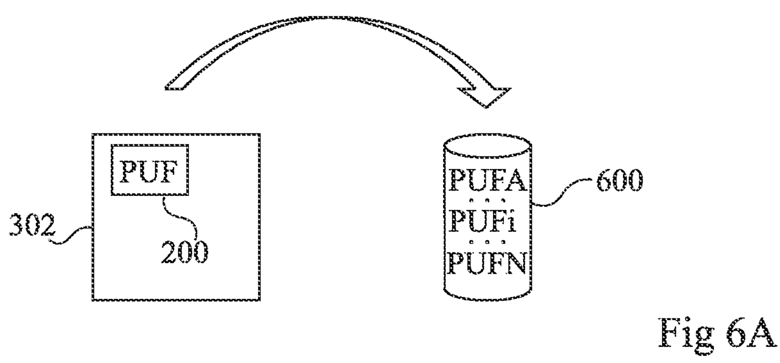
FIG. 6A shows a first step in a process for verifying the integrity of software according to a first embodiment of the present disclosure.
Figure 6B:
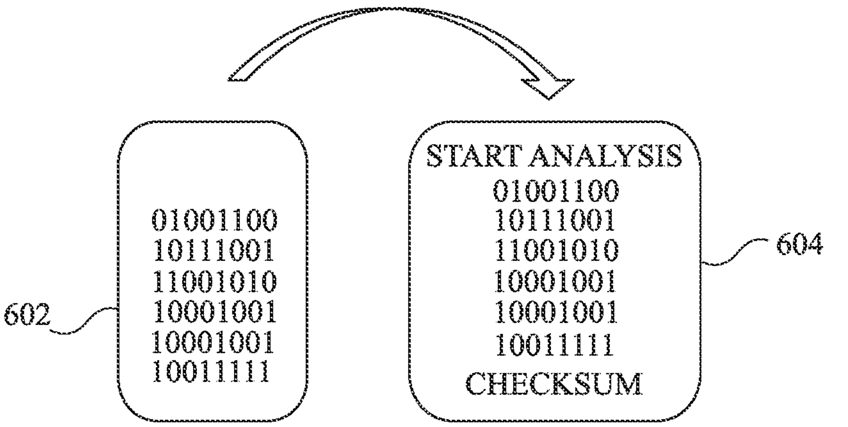
FIG. 6B shows a second step in a process for verifying the integrity of software according to a first embodiment of the present disclosure.
Figure 6C:
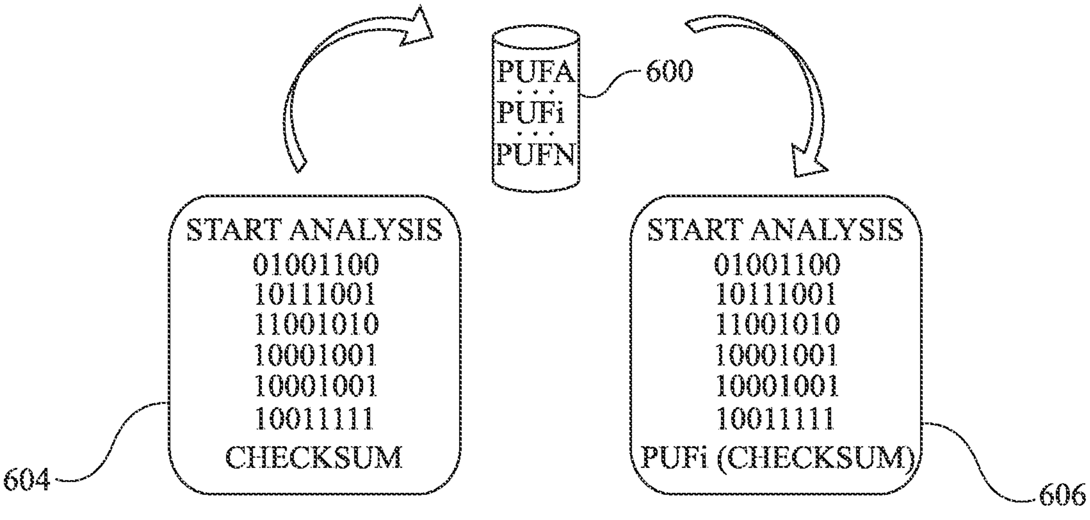
FIG. 6C shows a third step in a process for verifying the integrity of software according to a first embodiment of the present disclosure.

FIGS. 6A to 6C show the steps in the process of verifying the integrity of software according to the embodiment in which an image of the PUF 200 is saved in a memory of an external device.

FIG. 6A shows a first step in a process for verifying the integrity of software 314. In particular, FIG. 6A shows the step for saving an image of the PUF 200 of the circuit 302 in a memory 600 of an external device. This step is for example performed by the external device (not illustrated).

As an example, the memory 600 of the external device is a database containing a plurality of images of PUF (PUF A, PUF i, PUF N) coming from a plurality of circuits similar to the circuit 302. The image of the PUF 200 is for example stored in association with an identifier (PUF i) of the PUF 200.

The image of the PUF 200 in the memory 600 of the external device comprises for example the set of challenge-response pairs associated with the PUF 200.

This step of saving the PUF 200 image in the memory 600 of the external device is for example performed before programming the software 314. This step is for example performed directly after manufacture of the circuit 302.

FIG. 6B shows a second step in a process for verifying the integrity of software 314. This step is for example performed by the external device.

As an example, FIG. 6B illustrates step 508 in FIG. 5 of the instrumentation of the software 314. When performing step 506 in FIG. 5, a critical section 602 is for example identified. The instrumentation of section 602 consists for example in adding a START ANALYSIS instruction for example that the lines of instructions following this instruction are to be analyzed. The instrumentation of section 602 further consists for example in adding a CHECKSUM instruction for generating a value corresponding for example to the checksum of the set of instructions between the START ANALYSIS instruction and the CHECKSUM instruction. A code 604 illustrates the instrumented version of the code 602.

FIG. 6C shows a third step in a process for verifying the integrity of the software 314.

As an example, FIG. 6C illustrates an offline embodiment of steps 508 to 510 in FIG. 5.

As an example, the external device is configured to generate a value from the instrumented section 604, such as for example the checksum of section 604. The external device is for example configured to send the value generated in association with the identifier PUF i of the PUF 200 to the memory 600 of the external device in order to determine the value of the response of the PUF 200 when the challenge is the value generated.

The value of the response is sent by the external device to the electronic device 300. The value of the response is then for example stored in the non-volatile memory 304 as reference value for section 602.

The external device is for example further configured to modify section 604 to a section 606 for example replacing the CHECKSUM instruction by a PUFi(CHECKSUM) instruction. Section 606 is then sent to the device 300 and stored for example in the non-volatile memory 304. The modification has the effect, during compilation of section 606, of commanding the PUF 200 of the device 300 to calculate the response corresponding to the CHECKSUM challenge.

This embodiment for example enables a user to protect a software application that might be added, for example in a device 300 personalizing step.

According to this embodiment, the integrity verification performed in phase 504 is carried out between the version of software 314 stored in the volatile memory 304 and that loaded into the volatile memory 306. This embodiment thus enables attacks on the non-volatile memory 304 to be detected.

Figure 7A:
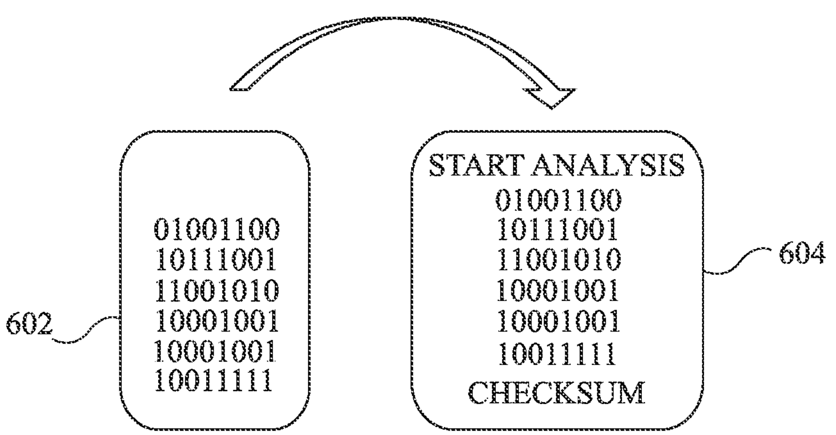
FIG. 7A shows a first step in a process for verifying the integrity of software according to another embodiment of the present disclosure.
Figure 7B:
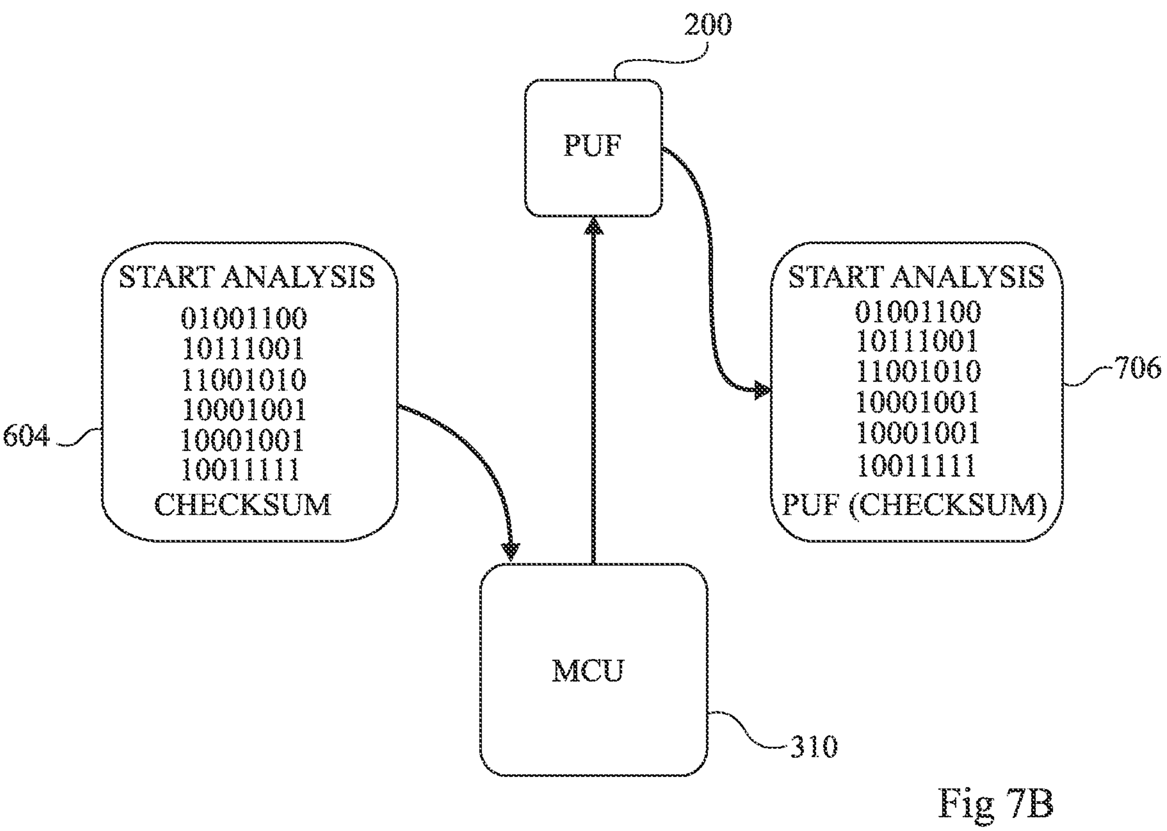
FIG. 7B shows a second step in a process for verifying the integrity of software according to another embodiment of the present disclosure.

FIGS. 7A and 7B show the steps in the integrity verification process according to the embodiment in which the reference values are calculated each time the software 314 is loaded into the volatile memory 306.

FIG. 7A shows a first step in a process for verifying the integrity of software 314.

In particular, FIG. 7A shows the step of the instrumentation 508 of section 602 into section 604 and is identical to the step described in relation to FIG. 6B. Following the instrumentation step, section 604 is for example stored in the non-volatile memory 304.

FIG. 7B shows a second step in a process for verifying the integrity of software 314.

As an example, FIG. 7B illustrates the performing online of step 510.

As an example, on starting the device 300, or more specifically on starting the processor 310, the software 314 is read in the non-volatile memory 304 and loaded into the volatile memory 306. While loading, the sets of instructions of the software 314 are analyzed, for example by another software application (not shown) in order to identify the critical sections, including section 602, identified, for example, in step 506. A value is generated, for example such as the checksum, from section 604 and is sent by the processor 310 to the PUF 200 of the circuit 302. The value of the response of the PUF 200 is then stored in the volatile memory 306. Section 604 is, for example, further modified into section 706 to include the PUF(CHECKSUM) instruction commanding the calculation of the verification value of section 602 using the PUF 200 of circuit 302. Section 706 is loaded into the volatile memory 306 to be executed, with the compiling of section 706 engendering the calculation of the verification value.

According to one embodiment, the circuit 302 further comprises a random number generator (not shown in FIG. 3). As an example, each time the processor 310 is started, a random number is generated by the random number generator, the random number generator being for example configured never to generate the same random number several times in succession. As an example, steps 403 and 511 comprise the concatenation of the random number with the value generated from sections 604 or 706. The challenges supplied to the PUF 200 by steps 403 and 511, and therefore the corresponding responses of the PUF 200, then depend on the starting of the processor 310.

According to one embodiment, the circuit 302 further comprises a timer (not shown) which is, for example, provided by a counter, and which is configured so that when a preset time is reached, a signal is sent to the processor 310. For example, the timer rate is set by the system clock in the device 300. The processor 310 is then for example configured so that, on reception of this signal, it verifies that the calculation of the reference values and/or verification have taken place. This provides for a modification, for example deleting the instructions START VERIFY, CHECKSUM and/or PUF(CHECKSUM) of the instrumented section 604 while it is still stored in the non-volatile memory 304.

Figure 8:
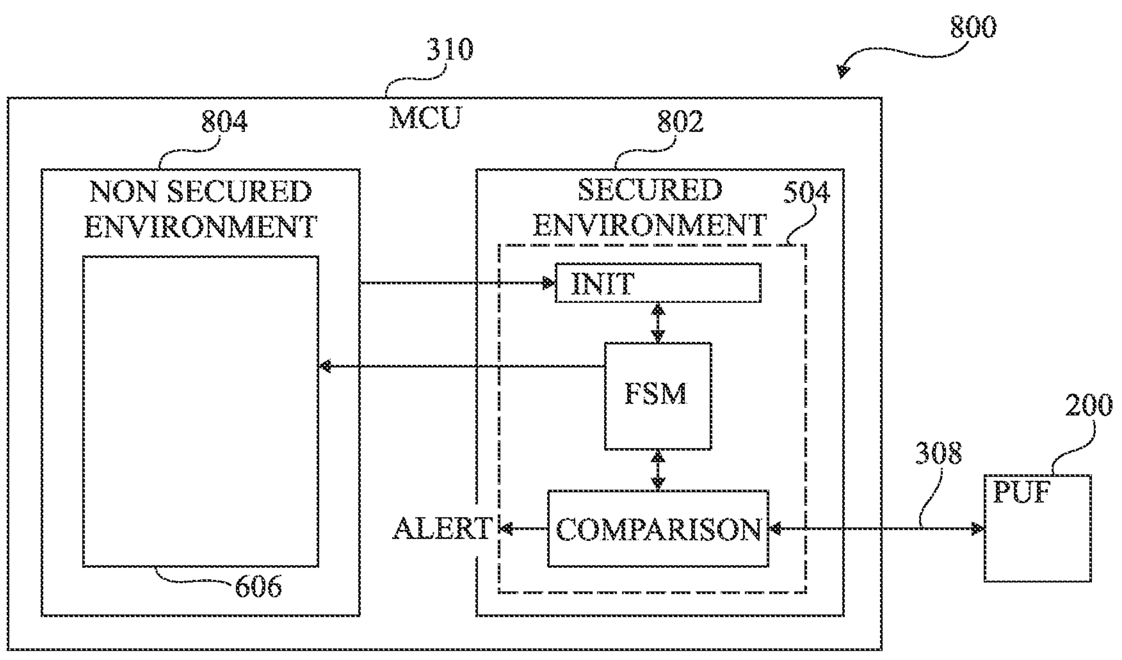
FIG. 8 shows highly schematically as a block diagram a software implementation of a processor according to an embodiment of the present disclosure.

FIG. 8 shows highly schematically as a block diagram a software implementation 800 of the processor 310 according to an embodiment of the present disclosure. In particular, the software 800 implementation enables the verification process described in relation to FIG. 4 to be used.

As an example, the processor 310 comprises a secured environment (SECURED ENVIRONMENT) 302 and a non-secured environment 304 (NON SECURED ENVIRONMENT).

As an example, when the software 314 is executed, the instrumented section 606 is loaded into the non-secured environment 804 of the processor 310. Phase 504 online is then software-implemented by the secured environment 802.

As an example, information relating to section 606 and/or section 706 is sent to the secured environment 802 enabling phase 504 to be initiated (INIT). A finite state machine (FSM), for example, software-implemented in the secured environment 802, then enables a value to be calculated such as the checksum of the code 706 and/or the code 706 and enables the flow control information of section 606 and/or section 706 to be verified. The value generated by the finite state machine is then sent to the PUF 200 via the bus 308 to obtain the verification value. The PUF 200 is then hardware-implemented in the circuit 302, but outside the processor 310.

When the verification value returned by the PUF 200, for example via the bus 308, differs from the reference value, stored for example in the non-volatile memory 304, the secured environment 302 generates for example an alert signal ALERT.

Figure 9:
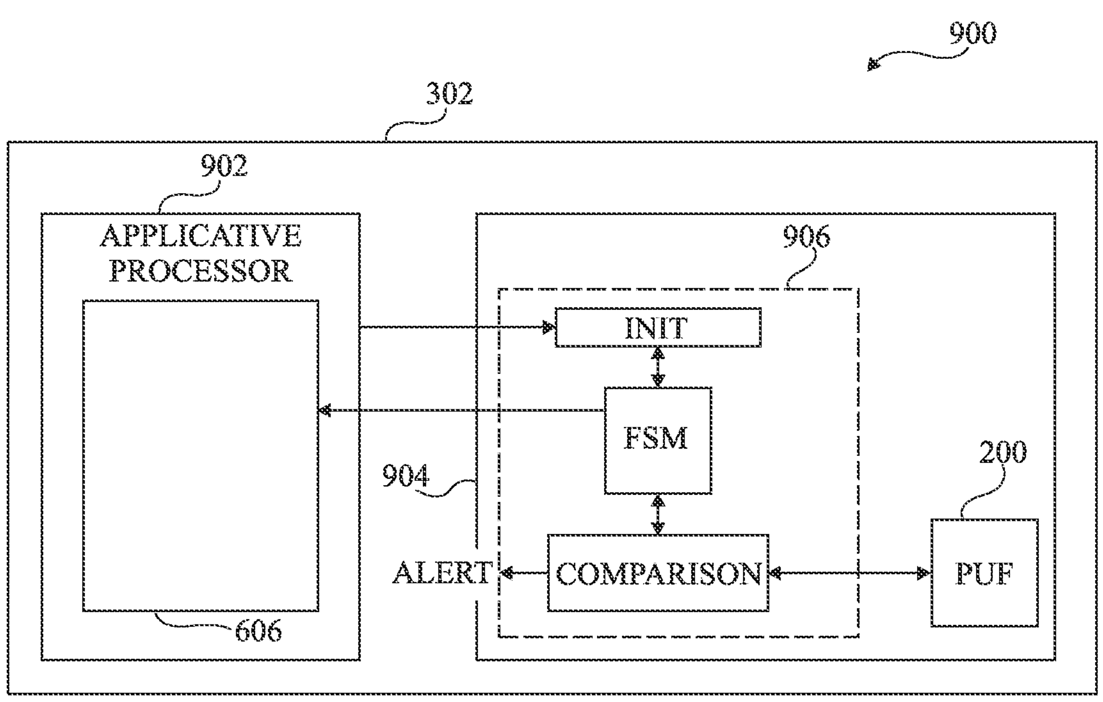
FIG. 9 shows highly schematically as a block diagram a hardware implementation of an integrated circuit according to an embodiment of the present disclosure.

FIG. 9 shows highly schematically as a block diagram a hardware implementation 900 of the circuit 302 according to an embodiment of the present disclosure in which the circuit is a system on chip (SoC). In particular, the software 900 implementation enables the verification process described in relation to FIG. 4 to be used.

The circuit 302 comprises for example an applicative processor 902 (APPLICATIVE PROCESSOR). As an example, the processor 310 described in relation to FIG. 3 implements the applicative processor 902. The circuit 302 further comprises an environment 904 comprising the PUF 200. The environment 904 further comprises a set 906 of sub-circuits for the hardware implementation of phase 504. The set 906 is then configured to extract information from section 606 and/or section 706 loaded for execution in the applicative processor 902. The set 906 is further configured to generate the verification value and to compare the corresponding reference value, for example stored in the volatile memory 306.

One advantage of the embodiments disclosed is that the reference values protecting the critical sections of one or more software codes are generated from the physically unclonable function of the associated device. The physically unclonable function is such that the reference values for the same software codes are different from one device to another, which enables the individualized securing of each electronic device.

Another advantage of the embodiments disclosed is that the reference values of a software code are not linked by the same encryption value. On the contrary, through the use of the PUF, the reference values are linked by no common value. In other words, there is no correlation between the two reference values. Thus, if an attacker obtains one of the reference values, they are still unable to modify the sections of software associated with other reference values.

Another advantage of the embodiments disclosed is acquired when the PUF implemented is a strong PUF. Since the set of "challenge-response" pairs is large, it is not possible for anyone attacking the device to know the whole of the PUF image.

Another advantage of the embodiments disclosed is that by the use of a memory of an external device storing an image of the PUF, the authenticity of the protected software is ensured.

Another advantage of the embodiments disclosed is that, when phase 502 is performed online, the reference values can differ from one starting of the device to another, thereby making the task of an attacker more complex.

Various embodiments and variants have been described. Those skilled in the art will understand that certain features of these embodiments can be combined and other variants will readily occur to those skilled in the art. In particular, phase 504 can be implemented both by hardware and by software.

Finally, the practical implementation of the embodiments and variants described herein is within the capabilities of those skilled in the art based on the functional description provided hereinabove. In particular, as far as the value used as "challenge" is concerned, although the example of checksums is given, other values can be used as "challenge".

What is claimed is:

1. A process verifying, by a verification circuit, the integrity of a software application, the process comprising:
- loading the software into a first volatile memory;
- computing a first verification value by the verification circuit, from the software loaded in the volatile memory;
- computing a second verification value by applying a physically unclonable function to the first verification value;
- comparing the second verification value, by the verification circuit, with a reference value obtained, before the verification of the integrity of the software, by applying the physically unclonable function to a value generated from the software; and
- if it is found that the second verification value differs from the reference value, outputting, by the verification circuit, a warning signal.

2. The process according to claim 1, wherein obtaining of a reference value by applying the physically unclonable function comprises the storing of an image of a physically unclonable function in a memory of a device external to the verification circuit, and the generation the reference value from the software and the image, the process further comprising the storage of the reference value in a second non-volatile memory.

3. The process according to claim 2, wherein obtaining the reference value is performed upon the loading of the software into the first memory, wherein the reference value is stored in the first memory.

4. The process according to claim 3, wherein obtaining the reference value is performed by applying the unclonable physical function to an input value based on the value generated from the software and on a random value.

5. The process according to claim 4, wherein the random value is equal to a first value for a first booting of the verification circuit and equal to a second value, different from the first value, for a second booting of the verification circuit.

6. The process according to claim 1, further comprising, before loading the software into the first memory, adding a verification instruction to the software triggering the computation of the first verification value.

7. The process according to claim 6, wherein the verification circuit implements a counter configured to indicate that a time after loading the software in the first memory is reached, the verification circuit being configured to verify that the verification instruction has been executed once the time has been reached.

8. The process according to claim 1, wherein the physically unclonable function is a strong physically unclonable function, specific to the verification circuit.

9. The process according to claim 1 further comprising, if it is found that the second verification value equals from the reference value, executing the software.

10. A circuit comprising:

a first volatile memory in which the software is loaded;

a processor configured to calculate a first verification value from the software loaded in the volatile memory;

a physically unclonable function circuit configured to generate a second verification value based on the first verification value; and a verification circuit configured to verify the integrity of a software application by comparing the second verification value with a reference value obtained, before the verification of the integrity of the software, by applying the physically unclonable function to a value generated from the software and generating at an output of the verification circuit a warning signal if the second verification value differs from the reference value.

11. The circuit according to claim 10, wherein the physically unclonable function circuit is further configured, before verifying the integrity of the software, to generate the reference value based on a value generated by the processor and on the software.

12. The circuit according to claim 11, wherein the generation of the reference value by the physically unclonable function circuit comprises the storage of an image of the physically unclonable function circuit in the memory of a device external to the verification circuit, the physically unclonable function circuit being further configured to generate the reference value from the software and from the image, the verification circuit being further configured to store the reference value in a second non-volatile memory.

13. The circuit according to claim 11, wherein the physically unclonable function circuit is configured to generate the reference value upon loading the software in the first memory, the verification circuit being further configured to store the reference value in the first memory.

14. The circuit according to claim 10, wherein the physically unclonable function circuit is configured to implement a strong physically unclonable function.

15. A system for initializing a device, the system comprising:

the circuit according to claim 10;

a device external to the circuit; and a memory of an external device configured to store an image of the function produced by the physically unclonable function circuit, the external device being configured to generate the reference value based on the image of the function produced by the physically unclonable function circuit.

* * * * *